United States Patent [19]

Sander

[11] Patent Number: 4,631,222

[45] Date of Patent: Dec. 23, 1986

[54] EMBOSSING FOILS

[75] Inventor: Helfried Sander, Nuremberg, Fed. Rep. of Germany

[73] Assignee: Messrs. Leonhard Kurz GmbH & Co., Fed. Rep. of Germany

[21] Appl. No.: 734,795

[22] Filed: May 16, 1985

[30] Foreign Application Priority Data

Jun. 20, 1984 [DE] Fed. Rep. of Germany ....... 3422910

[51] Int. Cl.[4] .............................................. B32B 3/00
[52] U.S. Cl. ..................... 428/172; 156/233; 156/235; 156/239; 156/240; 428/201; 428/206; 428/207; 428/209; 428/692; 428/913; 428/914; 428/915; 428/916
[58] Field of Search ............... 156/233, 235, 239, 240, 156/241; 428/172, 201, 206–209, 211, 692, 694, 913–916, 204

[56] References Cited

U.S. PATENT DOCUMENTS

| 4,223,057 | 9/1980 | Rejto ................................. 428/172 |
| 4,463,034 | 7/1984 | Tokunaga et al. .................. 428/694 |
| 4,503,110 | 3/1985 | Skene ................................ 428/172 |

Primary Examiner—George F. Lesmes
Assistant Examiner—P. R. Schwartz
Attorney, Agent, or Firm—Louis E. Marn

[57] ABSTRACT

A hot embossing foil includes, besides a magnetic layer, a layer which has a structure producing a diffraction effect such as a hologram. The foil may also be provided with a signing layer which in the operational condition of the foil is at the exposed surface thereof to which writing can thus be applied, while nonetheless permitting detection of the diffraction-effect structure.

21 Claims, 2 Drawing Figures

EMBOSSING FOILS

BACKGROUND OF THE INVENTION

The invention relates generally to embossing foils and more particularly to hot embossing foils.

U.S. Pat. No. 4,376,006 discloses an embossing foil construction comprising a backing foil and a transfer layer which can be removed therefrom and which comprises at least a magnetic layer consisting of a dispersion of magnetisable particles in a binding agent. A metal layer and a layer of lacquer are provided on the side of the magnetic layer which is towards the backing foil. That design seeks to afford the possibility of the magnetic embossing foil also being produced in bright attractive colours, for which purpose the magnetic layer, which is generally dark, is covered by the metal layer. Purely decorative purposes are therefore the consideration in that respect.

It is conventional practice for for example cheque cards, credit cards, savings books and similar security documents and items to be provided with magnetic strips, strips which can be signed thereon, or structures which have a particular optical effect in order thereby to make it possible to store certain items of data or to enhance the safeguards against forgeries. An advantage when using magnetic strips is that it is very easily possible to provide for suitable storage of relevant data in the magnetic strip. However, that design suffers from the disadvantage that forgery or erasure is a comparatively simple matter, with the usual forms of magnetic strips. In principle that depends on the way in which the magnetic strip is applied. It is true to say that for many areas of use, it has been found to be advantageous for the magnetic strips to be applied by means of embossing foils, in particular hot-process embossing foils, because in that case the strip can be easily applied to the security document or like item, and it is even possible for the magnetic strip to be coded before it is applied to the document or card in question.

Various ways have already been investigated, for increasing the safeguards against forgeries in respect of documents or security cards or the like bearing magnetic strips. In that connection, one known process provides for forming in the coating of the magnetic strip, a pattern of magnetisable pigments, which is directed at an angle of 45° with respect to the longitudinal direction. That 45° basic pattern in regard to the magnetisation effect cannot be altered at a level of cost such as to make it usually worthwhile for forgery purposes.

Another possible process lies in using a double-layer magnetic strip, wherein one layer has a high level of coercive force, that is to say, it carries items of information which are difficult to change, while the other layer which is usually on top of the first-mentioned layer receives the erasable data with a low level of coercive force. However, double-layer magnetic strips of that kind are comparatively difficult to produce and also give rise to problems in regard to encoding thereof.

Attempts have also already been made to provide the magnetic layer of magnetic strips with special graphic characters or symbols which consist of pigmented lacquers, in which respect both pigments which can be detected in visible light and also pigments which can be detected only in invisible light have been used. However, such a procedure suffers from the disadvantage that the pigmented layers must be comparatively thick so that, in order to produce a sufficient signal voltage, the magnetic layer must also be comparatively thick. However, difficulties are encountered in seeking to work tidily and cleanly with embossing foils which have a very thick magnetic layer and also a thick pigmented layer. It should also be borne in mind that, in order to be able to code a foil, the surface thereof must be very flat and even. That is also an aspect which leaves something to be desired when using pigmented lacquers for producing the pattern designed to prevent forgeries, as the surface produced is comparatively wavy. Such a wavy surface configuration also suffers from the disadvantage that there must necessarily be a comparatively large distance between the magnetic layer and the reading head, whicn in turn also gives rise to a reduction in the signal voltage. There is also the danger that a rough surface may result in premature damage to the reading head of the reading device used.

Finally, attempts have also already been made to use structures which have an optical diffraction effect and in particular which have a holographic effect, for the purposes of characterising and identifying security documents, cards and the like items. In the past, those structures have predominantly been embossed directly into cards made from plastic material. The attempt has also already been made to provide embossing foils with diffraction structures having a holographic effect (phase holograms), but hitherto no further identification or characterisation means or information has been included in the foils, besides the diffraction structures. The use of such structures gives a high level of safeguard against forgery because that structure is severely damaged or destroyed in the event of an attempt being made to strip off the corresponding foil. Furthermore, the diffraction structure can be easily read by machine, by means of lasers or LEDs. However, there are also holograms which can be detected with the naked eye. Furthermore, by means of a particular arrangement, in particular in regard to reflection holograms, it is possible to provide that characteristic changes in the diffraction images can be produced even with different conditions of illumination, in daylight and artificial light, whereby it is possible to provide a visually clearly detectable feature indicating authenticity in respect of a document. However, a disadvantage of such an arrangement is that it is not possible to alter the information once it has been stored on the document. It is at best possible to produce erasure of the diffraction structure over a certain area, but that is then irreversible.

SUMMARY OF THE INVENTION

An object of the present invention is to provide an embossing foil which is capable of storing variable data.

Another object of the invention is to provide an embossing foil which substantially excludes the possibility of forgery in respect thereof by virtue of its being capable of being readily provided with suitable, permanent authenticity features.

Yet another object of the present invention is to provide an embossing foil including data recording means and also having a space for signature or other writing thereon.

Yet another object of the invention is to provide an embossing foil having means for storing data and also a space for signature thereon, with the data storage means and the signature space being contained in a compact arrangement but without interfering with each other.

In accordance with the present invention, these and other objects are achieved by an embossing foil such as a hot embossing foil which comprises a backing foil and a transfer layer which is adapted to be removed therefrom and which comprises at least a magnetic layer formed from a dispersion of magnetisable particles in a binding agent. On its side or surface which is remote from the backing foil, the transfer layer may optionally carry an adhesive layer for securing the transfer layer to a substrate, while on its side which is towards the backing foil, it may have a layer of protective lacquer. Furthermore, between the magnetic layer and the backing foil there is at least one diffraction layer adapted to receive a structure giving an optical diffraction effect such as a holographic effect.

The invention therefore provides an embossing foil, more particularly for example a hot-process embossing foil, which on the one hand permits storage in the magnetic layer of variable data, for example the state of an account, and so forth, while on the other hand also readily permitting the application to a document of security features which are not to be variable, being produced on the document more specifically by means of the optical diffraction structure. If an attempt is made to alter that structure on the foil once it has been set in position by the embossing process, the structure is generally severely damaged or even destroyed, even if the magnetic layer is not additionally damaged. In spite of including said structure, the foil according to the invention may be of such a configuration that the layers over the magnetic layer are so thin that the signal produced by the magnetic layer complies with the relevant standards. In that connection, the admissible thickness of the diffraction layer essentially depends on the magnetic properties of the magnetic layer and more particularly the nature, the state of dispersion, the orientation relationship, the level of pigmentation and the thickness of the magnetic layer, and obviously also the pigment used. As the diffraction layer may be comparatively thin, it is also possible to employ the normal, comparatively thin magnetic layers (which are less than 10 $\mu$m in thickness), and that aspect has in particular advantageous consequences on the workability and handleability of the foil as well as the properties thereof, for example in regard to cohesion of the layers. Furthermore, the use of the principles according to the invention in an embossing foil gives the advantage that the foil has a very smooth surface after having been embossed into position, as the degree of smoothness of the surface depends on the surface of the backing foil. If for example the backing foil is a polyester film, it can be assumed that the degree of surface roughness thereof is less than 1 $\mu$m so that the quality of the embossed surface, with a satisfactory embossing tool, is far superior to the required standard of a mean value of roughness of a maximum of 2.5 $\mu$m. In addition, the fact that the diffraction layer is bound into or incorporated into the embossing foil has the great advantage over the idea, which is perfectly feasible, of subsequently applying a hologram-containing layer to the magnetic layer, that clearly it is substantially more difficult to remove the diffraction layers, that is to say, to produce a forgery, with the foil in accordance with the present invention. The teaching of the present invention also provides advantages from the manufacture point of view as the fact that the authenticity characters or symbols are combined with the data carrier in a single foil means that only one working operation is now required for applying the embossing foil, whereas hitherto the authenticity features were usually applied in one working operation and the data carrier, for example the magnetic layer, was applied in another operation. Moreover, a particularly high degree of safeguard against forgeries can be attained if the data stored in the magnetic foil is adapted to the optical diffraction structure in a certain manner, that is to say, if there is a given association therebetween. In such a case, falsification for example of the data in the magnetic layer can be rapidly ascertained. Furthermore, it is also possible for basically the same data to be stored in the magnetic layer and in the diffraction layer, in which case simple comparison between the sets of stored data would show whether falsification had or had not occurred.

The structures with the optical diffraction effect are more particularly holographic diffraction structures, including both visible holograms and also holograms which are not visible with the naked eye or under normal lighting. It should also be noted that in accordance with the invention it is immaterial whether the structures in question can or cannot be read by machine.

In an advantageous embodiment of the invention, the diffraction layer is formed by a layer of protective lacquer for the magnetic layer, into which the structure with the optical diffraction effect is embossed, preferably on the side of the diffraction layer which faces towards the magnetic layer. Using the layer of protective lacquer in that way does not result in any increase in thickness in comparison with conventional magnetic-type embossing foils. In addition, apart from the embossing operation, there is no need for any additional working operation. Furthermore, when the above-mentioned structure is formed on the side of the diffraction layer which faces towards the magnetic layer, there is the further advantage that said structure is still protected after the foil has been embossed in position, and the foil also has a satisfactory, smooth surface.

Particularly when said structure is to be visible with the naked eye, it is desirable for a layer of a non-magnetisable metal to be provided on the side of the magnetic layer which is towards the backing foil, between the magnetic layer and a layer of protective lacquer. The non-magnetisable metal layer has the said structure, preferably comprising a layer of aluminium or aluminium alloy, which is applied by vapour deposit. Applying an additional metal layer in the above-indicated fashion may result in improved visibility of the diffraction structure. On the other hand, such a metal layer can also produce further effects in regard to the appearance of the document which is to be safeguarded, and that is a matter of significance in regard to certain areas of use.

Credit cards, cheque cards and a large number of other security documents and cards or like items are frequently valid only after they have been signed by the holder thereof. As in particular credit cards and cheque cards frequently comprise a plastic material which has a smooth surface, it is necessary to provide a special area for signature purposes. In that connection, the attempt has already been made to improve the safeguards against forgery of the card by the substrate or background of the signature area being made in a specific fashion, for example by a special imprint, by using a background priming material which changes in colour when an attempt at erasure is made, or which reacts with the writing liquid to undergo a change in colour, and so forth. A disadvantage with such a procedure however is that the signature surface must be produced in a special working operation. If now, in accordance with a preferred embodiment of the invention, the embossing foil includes, between the magnetic layer and the backing foil, a layer of lacquer forming a signing layer, as it will be referred to hereinafter, which can be written upon and which, after the embossing operation and after removal of the backing foil, forms the surface of the embossing foil, with said signing layer being applied in a region-wise manner in such a fashion that the optical diffraction structure is still visible or detectable from the side of the signing layer, there is the advantage that use of the foil in accordance with the invention not only provides the possibility of storing variable data, in the form of the magnetic layer, as well as invariable data, in the form of the optical diffraction structure, but at the same time it affords the option of putting a signature on the foil.

In that connection, the configuration of the foil may be such that the signing layer is provided in surface portions of the embossing foil, which are distinguished from the surface portions where the optical diffraction structure is provided, that is to say for example a signing layer may be disposed between two holograms or the like.

In an advantageous embodiment of the invention however the signing layer is provided between the backing foil and the diffraction layer, although extending over the latter only in a grid-like pattern. Therefore, with such a foil configuration in accordance with the invention, the procedure is such that the lacquer forming the signing layer, which can be suitably written upon, is only provided in a grid-like configuration as by an imprinting process, between the diffraction layer and the backing foil, so that the diffraction layer still appears in the spaces defined by the grid-like configuration. That arrangement makes it possible on the one hand to write on the foil, while on the other hand the hologram or other optical diffraction-effect structure can still be detected, more specifically because it is possible for example in regard to holograms and other specific optical diffraction structures for them to be of such a nature that they still supply all their information even when a part of the structure is covered or masked. That is because each element of the surface of the diffraction structure is capable of supplying the whole of the items of information stored in the structure, although obviously in that case with a reduced signal-noise ratio. The diffraction layer may be covered by the signing layer in a grid-like configuration in various forms, for example by a dot grid, a line grid or however also in the form of a character of quite specific configuration.

As will be appreciated, the fact that the above-mentioned signing layer is applied only to limited surface portions of the foil would have the result that the free surface of the foil, after removal of the backing foil, would be uneven, which is undesirable. To prevent that from occurring, the invention proposes in a preferred embodiment that the surface portions of the magnetic layer or the diffraction layer, which are not covered by the signing layer, are to be covered by a layer of clear lacquer of suitable thickness. The clear lacquer does not then interfere with readability of the optical diffraction-effect structure. It is particularly advantageous for the layer of clear lacquer to be formed by a release or peel-off lacquer as in that case there is no need to provide a separate separation or release layer between the backing foil and the signing layer. Furthermore, a construction of that nature has the advantage that the signing layer comes away from the backing foil less easily than the layer of clear lacquer, with the result that pieces of the signing layer remain clinging to the backing foil, thus imparting a roughness to the surface of the signing layer, to a degree which is sufficient to facilitate writing thereon.

In accordance with a further embodiment of the invention, the diffraction layer and/or the magnetic layer and/or the layer of protective lacquer and/or the layer of clear lacquer and/or the signing lacquer is or are coloured, thereby making it possible to achieve particular optical or decorative effects which may be an important consideration in certain situations of use.

The layers of lacquer may be applied by means of the processes which are known in connection with the manufacture of embossing foils, depending on the viscosity of the lacquer used and the thickness of the respective layers, for example by means of pattern rollers (intaglio printing), a roller-type squeegee or doctor, a reverse roller process, casting, and so on.

The metallisation operations may also be carried out using known processes which operate without pigment, for example vacuum vapour deposit or cathode ray sputtering.

Further objects, features and advantages of the invention will be apparent from the following description of two preferred embodiments of hot-process embossing foils according to the invention.

DESCRIPTION OF PREFERRED EMBODIMENTS

Figure 1:
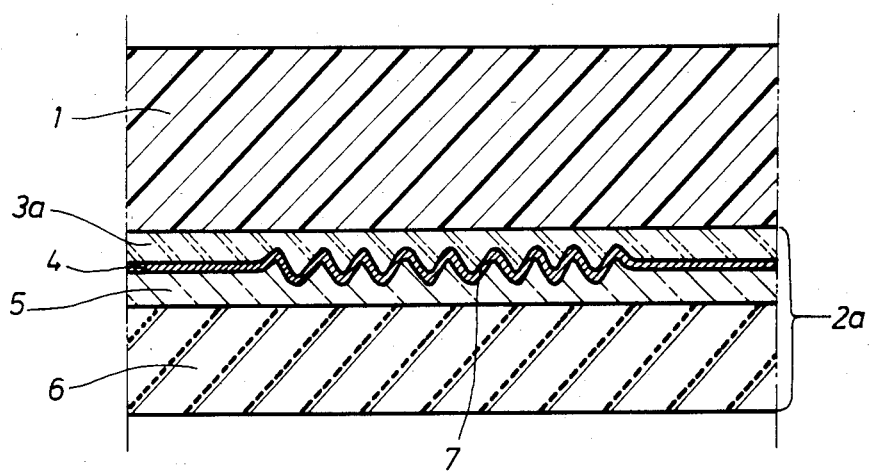
FIG. 1 shows a view in section through an embossing foil having a magnetic layer and a diffraction layer.

Referring to the drawings, shown therein are embossing foils which each include a carrier or backing foil 1 which is for example about 19 $\mu$m in thickness and which comprises any suitable material such as polyethylene glycol terephthalate. Applied by printing to the carrier or backing foil 1 is a transfer layer 2a (FIG. 1) or 2b (FIg. 2), which can be released from the backing foil 1.

Figure 2:
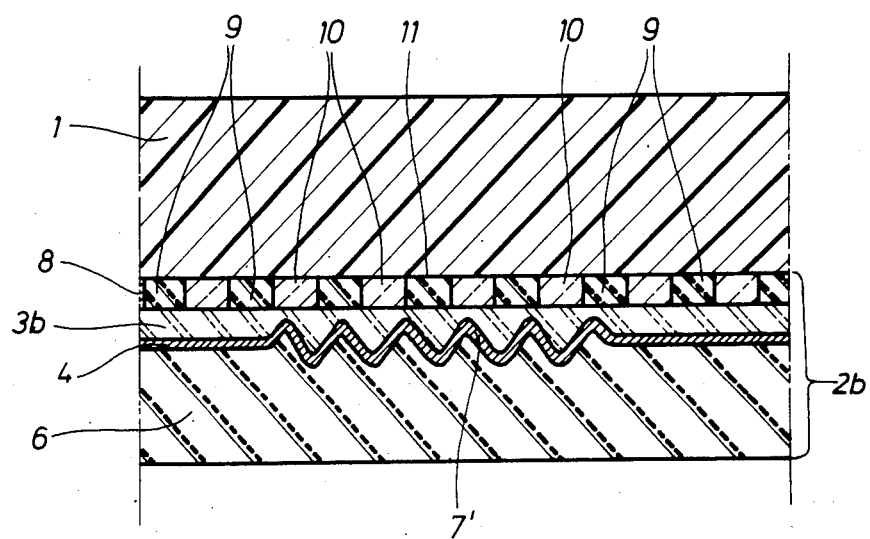
FIG. 2 shows a view in section through a hot embossing foil with a magnetic layer, a diffraction layer and a signing layer.

The difference between the foils shown in FIGS. 1 and 2 respectively lies in the nature of the respective transfer layers 2a and 2b.

Referring firstly now to FIG. 1, the transfer layer 2a comprises, starting from the backing foil 1, a layer 3a of protective lacquer which serves at the same time as a diffraction layer, a thin metal layer 4, a layer 5 of adhesive and a magnetic layer 6. The thicknesses of the respective layers are not shown true to scale. For example, in the normal situation, the thickness of the layer 3a is from 0.3 to 1.2 $\mu$m, while the metal layer 4 which is applied for example by vapour deposit is from 0.01 to 0.04 $\mu$m in thickness. The layer 5 is usually applied in a thickness of from 0.2 to 0.7 $\mu$m. The thickness of the magnetic layer 6 is from 4 to 12 $\mu$m, preferably about 9 $\mu$m.

While the metal layer 4 and therewith the mutually facing surfaces of the layers 3a and 5 are substantially flat in the edge region in FIG. 1, that is to say, at the left-hand and right-hand sides respectively in FIG. 1, substantially in the centre of the view shown in FIG. 1 the metal layer 4 has a structure 7 which is shown as being of a wavy or corrugated configuration, for the sake of simplicity. In actual fact, the structure 7 is substantially more complicated and involves a structure having an optical diffraction effect, namely a holographic effect.

The compositions of the individual layers of lacquer 3a and 5 and the magnetic layer 6 are as follows:

| Component | Parts by wt |
| --- | --- |
| Lacquer A (protective layer 3a) | |
| High-molecular PMMA resin | 2000 |
| Silicone alkyd oil-free | 300 |
| Non-ionic wetting agent | 50 |
| Low-viscosity nitrocellulose | 750 |
| Methyl ethyl ketone | 12000 |
| Toluene | 2000 |
| Diacetone alcohol | 2500 |
| Lacquer B (layer 5) | |
| High-molecular PMMA resin | 1200 |
| Methyl ethyl ketone | 3400 |
| Toluene | 1000 |
| Matting agent | 100 |

Magnetic layer 6

The layer 6 comprises a dispersion of needle-like $\gamma$-$Fe_2O_3$-magnetic pigment in a polyurethane binding agent, various lacquer additives and a solvent mixture comprising methyl ethyl ketone and tetrahydrofuran. Such dispersions are known per se.

The operating procedure in manufacture of the foil shown in FIG. 1 is as follows:

Taking the backing foil, being a polyethylene glycol terephthalate foil of from 19 to 23 $\mu$m in thickness, preferably about 19 $\mu$m in thickness, the above-indicated lacquer A is applied thereto with a line grid or pattern intaglio printing roller, the weight of application of the lacquer A being 2.2 g/m² after drying. Drying is effected in a tunnel drier at a temperature of about 100° to 120° C.

The structure 7, being in this case a hologram, is then embossed into the lacquer layer 3a, at a temperature of about 130° C., by means of a die which for example comprises nickel. That operation is effected at different times in dependence on the formula of the lacquer used for producing the layer 3a. Following the operation of producing the structure 7, the layer of lacquer 3a is set by cross-linking or in some other fashion.

For the purposes of producing the structure 7, the die is preferably electrically heated. Before the die is lifted from the lacquer 3a after the operation of producing the structure 7, the die may be cooled down again.

As soon as the structure 7 has been produced and the layer of lacquer 3a is sufficiently hard, aluminium is applied by vapour deposit to the layer 3a, under a pressure of $1.3 \cdot 10^{-4}$ mbar, with the thickness of the layer applied being about $200 \text{ Å} \cdot 10^{-10}$ m.

The adhesive layer 5 comprising the lacquer B is then applied to the metal layer 4, with an applied weight of 0.4 g/m², and finally the magnetic dispersion is applied to form the magnetic layer 6, with a thickness after calendering of 6.5 $\mu$m.

It will be appreciated that the magnetic layer 6 does not necessarily have to be of the above-indicated composition. Instead of the $Fe_2O_3$ pigments, it would also be possible to use for example other magnetic pigments, for example Co-doped magnetic iron oxides or other finely dispersed magnetic materials (such as Sr or Ba-ferrite). The combination of binding agents of the magnetic layer may possibly also be such that the adhesive layer 5 can be omitted because the magnetic layer may be caused to adhere firmly directly to the metal 4 (as set forth hereinafter in relation to the construction shown in FIG. 2).

It would also be possible for a hot-adhesive layer also to be applied to the magnetic layer 6. The choice of whether to use such a layer or not depends on the composition of the substrate to which the foil is to be applied. If the substrate comprises for example PVC, as is generally the case with credit cards, it is normally possible to omit a special hot-adhesive layer.

Reference will now be made to a second embodiment of the principles of this invention, as shown in FIG. 2, wherein the embossing foil comprises a transfer layer 2b which, like the transfer layer 2a of the embodiment shown in FIG. 1, comprises a magnetic layer 6, a metal layer 4 and a layer 3b of protective lacquer, with a structure 7' having an optical diffraction effect. The major difference between the foil shown in FIG. 2 and that shown in FIG. 1 is that the foil of FIG. 2 is additionally provided with a layer 8 adjoining the backing foil 1, the layer 8 being intended to permit writing to be applied to the foil when in the condition of having been applied to a substrate such as a credit card.

The layer 8 must be of such a configuration that, in spite of its being present in the foil after it has been applied, that is to say, when the backing foil 1 has been peeled off, the structure 7' is still visible from the side at which the backing foil 1 is disposed in FIG. 2. That is achieved by virtue of the fact that, as will be described hereinafter, the actual layer or surface to which writing such as a signature is to be applied only occurs in certain regions or areas of the layer 8. The configuration provided for that purpose will be described in greater detail hereinafter, but it may be noted at this point that this gives one possible way for the signing layer and the diffraction structure 7' to be provided in areas which are strictly separated from each other in terms of space, so that although the signing layer and the structure 7' can be applied to the substrate in one working operation, the signature is to be produced at a position different from that of the structure 7'.

Now, the situation in the case of the embodiment illustrated in FIG. 2 is that the layer 8 is formed from two kinds of lacquers, namely a layer 9 which is usually not transparent and which can be written upon and which is applied in a grid or pattern-like configuration, for example in the for of a dot pattern or grid, a bar or line pattern or grid, and so forth, and a further transparent or translucent lacquer as indicated at 10 in FIG. 2, which is provided in each of the spaces defined between the portions of lacquer 9. The lacquer 9 and the lacquer 10 filling the spaces therebetween are of approximately the same thickness so that the layer 8 formed thereby has a generally flat and even surface as indicated at 11 in FIG. 2, facing towards the backing foil 1. The lacquer 9 must include a pigment or the like which is sufficiently absorbent in regard to ink or other writing fluid such as ball point paste. In addition, the surface of the layer of lacquer 9 must be sufficiently rough to permit writing to be satisfactorily produced thereon. In spite of the presence of a non-transparent lacquer 9 on the foil, it can be assumed that, particularly if the structure 7' is a hologram, it can be satisfactorily read even if with a poorer signal-noise ratio, as holograms afford the possibility of storing all the items of information in each and every region thereof.

The lacquers used in the embodiment shown in FIG. 2 are as follows:

Lacquer A: see the FIG. 1 embodiment

This lacquer is used for filling up the intermediate spaces 10 between the portions of lacquer 9 to which writing can be applied.

| Component | Parts by wt |
| --- | --- |
| Lacquer D (signing lacquer layer 9) | |
| PVC/PVac copolymer | 4000 |
| Low-viscosity nitrocellulose | 2000 |
| Oil-free alkyd | 50 |
| Silicone polyester resin | 2000 |
| Flow agent | 800 |
| Dioctylphthalate | 500 |
| Methyl ethyl ketone | 25000 |
| Toluene | 2000 |
| Ethyl acetate | 2000 |
| Cyclohexanone | 1000 |
| Diacetone alcohol | 1000 |
| Calcium carbonate | 25000 |
| Lacquer E (diffraction layer 3b) | |
| Methyl-/n-butyl-methacrylate | 1000 |
| Low-viscosity nitrocellulose | 1000 |
| Phenol-modified colophony | 500 |
| Methyl ethyl ketone | 4000 |
| Toluene | 3000 |
| Ethyl acetate | 1500 |
| 98/100 butyl acetate | 3000 |

The foil shown in FIG. 2 is produced in the following fashion:

Using a two-colour printing machine with a degree of register inaccuracy of less than 0.05 mm, using two intaglio printing pattern rollers, the lacquers D and A are printed in a condition of precise and close interengagement with each other (to form the layer portions 9 and 10), on a polyethylene glycol terephthalate foil 19 $\mu$m in thickness. The above-mentioned lacquers D and A are initially produced in compliance with the above-mentioned requirements, but with a reduced solvent content, and then after test printing are diluted down to such a degree that the dry layer thickness in respect of the two lacquers is just of the same magnitude and is about 1.5 $\mu$m. That produces on the foil 1 a continuous layer 8 of substantially uniform thickness, which is made up of portions 9 of signable lacquer D and other portions 10 formed by the lacquer A. The lacquer A at the same time has the property of easily separating from the backing foil 1 while the lacquer D possibly clings to the backing foil 1 so that, when the backing foil 1 is peeled off, the lacquer D tears away at its surface, thus providing a rough surface to which writing can be more readily applied.

Subsequently to the operation of applying the lacquers D and A to the foil, the lacquer E is applied with a line pattern or grid intaglio printing roller, in a weight of 1.2 g/m$^2$, and is dried at 120° C.

Then, as described above with reference to the embodiment shown in FIG. 1, the structure 7' is embossed or impressed into the lacquer E and the metal layer 4 which comprises for example aluminium or an aluminium alloy is applied by vapour deposit. Then, once again in the same fashion as described above with reference to FIG. 1, an adhesive layer of about 0.4 $\mu$m in thickness can be applied, followed then by the magnetic dispersion forming a layer of 9 $\mu$m in thickness. However, as shown in FIG. 2, and as mentioned above, it is also possible for the adhesive layer which is indicated by reference numeral 5 in FIG. 1 to be omitted, with the magnetic layer 6 being stuck directly to the metal layer 4.

In principle, it would also be possible for the structure 7 or 7' not to be directly embossed or impressed into the layers of lacquer 3a and 6b respectively, but first to apply the metal layer 4 and then to form the structure 7 or 7' therein.

Both the embossing foil shown in FIG. 1 and that shown in FIG. 2 showed in conventional test procedures that they complied with the requirements of the current standards relating to magnetic data carriers. More particularly, each of the illustrated embodiments produced adequate signal voltages and enjoyed adequate resistance to wear and abrasion.

It will be appreciated that the embodiments described hereinbefore with reference to FIGS. 1 and 2 have been set forth solely by way of example of the principles of the present invention, and that other modifications and alterations may be made therein without thereby departing from the spirit and scope of the present invention.

What is claimed is:

1. An embossing foil comprising a backing foil having first and second surfaces, and on said first surface of said backing foil a transfer layer means which is releasable therefrom, said transfer layer means including: a diffraction layer having first and second surfaces, and comprised of, at least in part, a protective lacquer, said diffraction layer having a portion thereof configured to provide an optical diffraction structure; and a magnetic layer having first and second surfaces and comprising a dispersion of magnetisable particles in a binding agent, said first surface of said diffraction layer being disposed towards said first surface of said backing foil, and said second surface of said diffraction layer lacquer being disposed towards said first surface of said magnetic layer.

2. An embossing foil as set forth in claim 1 wherein said optical diffraction structure provides a holographic effect.

3. An embossing foil as set forth in claim 1 and further including at said second surface of said magnetic layer an adhesion promoting layer for securing said transfer layer means to a substrate to which it is to be applied.

4. An embossing foil as set forth in claim 1 wherein said optical diffraction structure is embossed onto said second surface of said diffraction layer.

5. An embossing foil as set forth in claim 1 wherein said diffraction layer comprises a layer of protective lacquer forming said first surface of said diffraction layer, and a layer of non-magnetisable metal disposed adjacent to said layer of protective lacquer.

6. An embossing foil as set forth in claim 5 wherein said layer of non-magnetisable metal is a layer of aluminum applied by vapour deposit.

7. An embossing foil as set forth in claim 5 wherein said layer of non-magnetisable metal is a layer of aluminum alloy applied by vapour deposit.

8. An embossing foil as set forth in claim 1 and further including between said first surface of said backing foil and said first surface of said diffraction layer, a layer of lacquer which can be written upon to constitute a signing layer and which after removal of said backing foil, forms an exposed surface of the embossing foil, said signing layer being applied in a region-wise manner such that said optical diffraction structure is still recognisable from the side of said signing layer.

9. An embossing foil as set forth in claim 8 wherein said signing layer is provided in surface portions of the foil, which are demarcated from surface portions at which said structure is provided.

10. An embossing foil as set forth in claim 9 wherein surface portions of said diffraction layer which are not covered by said signing layer portions are covered with a layer of clear lacquer of corresponding thickness for forming a flat surface on said transfer layer means.

11. An embossing foil as set forth in claim 10 wherein said layer of clear lacquer is formed by a release lacquer.

12. An embossing foil as set forth in claim 10 wherein said layer of clear lacquer is coloured.

13. An embossing foil as set forth in claim 8 wherein said signing layer is provided between said backing foil and said diffraction layer, only extending over the latter in a grid-like pattern.

14. An embossing foil as set forth in claim 13 wherein surface portions at which said diffraction layer is not covered by said signing layer are covered with a layer of clear lacquer of corresponding thickness for forming a flat surface on said transfer layer means.

15. An embossing foil as set forth in claim 14 wherein said layer of clear lacquer is formed by a release lacquer.

16. An embossing foil as set forth in claim 14 wherein said layer of clear lacquer is coloured.

17. An embossing foil as set forth in claim 8 wherein said signing layer is coloured.

18. An embossing foil as set forth in claim 1 wherein at least one of said diffraction layer and said magnetic layer and said layer of protective lacquer is coloured.

19. An embossing foil comprising a backing foil having first and second surfaces, and releasably carried on said first surface of said backing foil a transfer layer means adapted to be applied to a substrate to which it is to be secured, whereafter said backing foil is to be peeled off, said transfer layer means comprising: a magnetic layer formed by a dispersion of magnetisable particles in a binding agent; and between said magnetic layer and said backing foil a diffraction layer having first and second surfaces and comprising, at least in part, a protective lacquer, and having a portion thereof configured to provide an optical diffraction structure.

20. An embossing foil as set forth in claim 19 and further including between said diffraction layer and said backing foil a further layer of lacquer.

21. An embossing foil as set forth in claim 20 wheein said further layer comprises a lacquer which can be written upon to constitute a signature surface.

* * * * *

UNITED STATES PATENT AND TRADEMARK OFFICE
CERTIFICATE OF CORRECTION

PATENT NO. : 4,631,222

DATED : DECEMBER 23, 1986

INVENTOR(S) : HELFRIED SANDER

It is certified that error appears in the above-identified patent and that said Letters Patent is hereby corrected as shown below:

In the Claims:

Claim 19, line 6, between "off" and ",", insert -- said transfer layer means --; and Claim 21, line 1, delete "wheein" and insert -- wherein --.

Signed and Sealed this

Twenty-first Day of April, 1987

Attest:

DONALD J. QUIGG

Attesting Officer

Commissioner of Patents and Trademarks